July 30, 1940.　　　C. M. LIVINGSTON　　　2,209,737
PULLEY
Filed Sept. 26, 1939　　　2 Sheets-Sheet 1

Charlie M. Livingston
INVENTOR

BY Philip A. H. Terrell
ATTORNEY

July 30, 1940.　　　C. M. LIVINGSTON　　　2,209,737
PULLEY
Filed Sept. 26, 1939　　　2 Sheets-Sheet 2
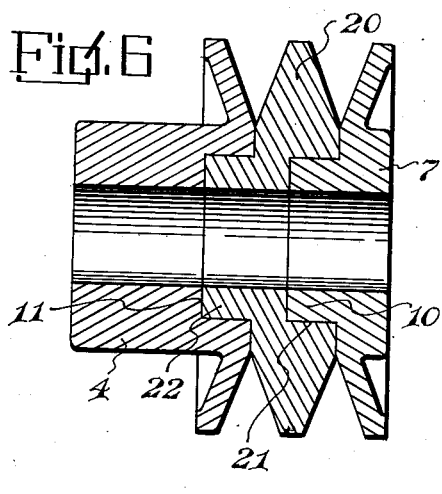
Fig. 6
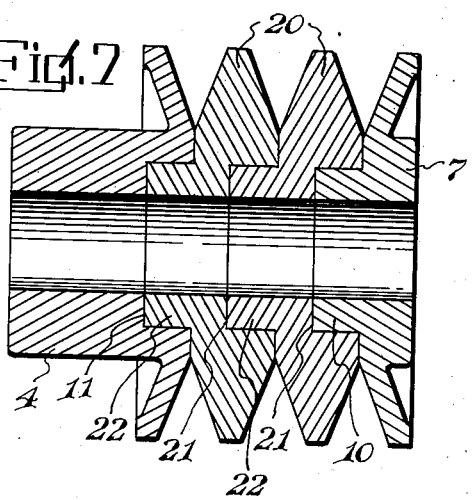
Fig. 7
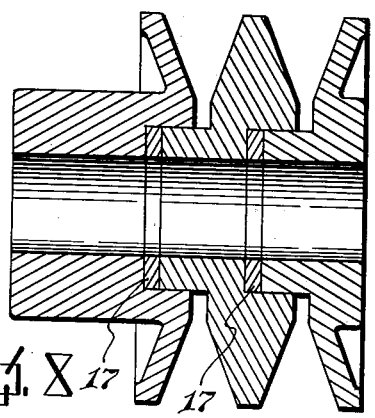
Fig. X
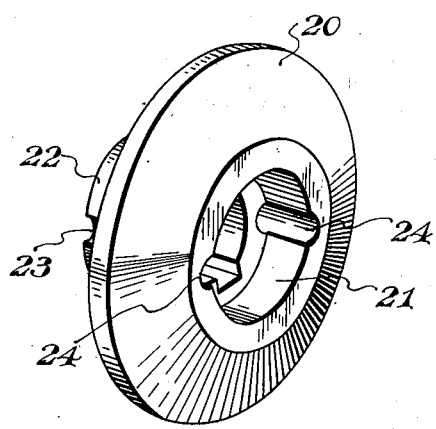
Fig. 9
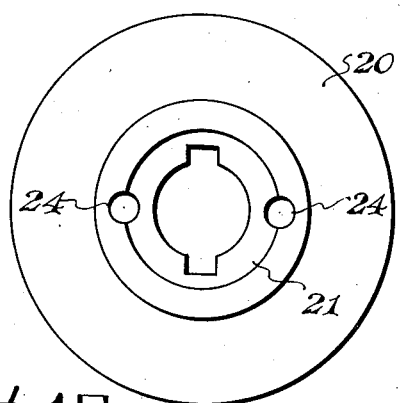
Fig. 10
Charlie M. Livingston
INVENTOR
BY Philip A. Powell
ATTORNEY Patented July 30, 1940

2,209,737

UNITED STATES PATENT OFFICE 2,209,737

PULLEY

Charlie M. Livingston, Tulsa, Okla.

Application September 26, 1939, Serial No. 296,666

4 Claims. (Cl. 74—230.17)

The invention relates to pulleys of the V-belt type and has for its object to provide a device of this character built up from a plurality of sections and adjustable to receive various size belts or a plurality of belts of the same or different size, thereby obviating the necessity of carrying in stock a multiplicity of pulleys for the various sizes of belts and combination of sizes.

A further object is to provide a pulley comprising a hub section forming one side of the pulley groove and one or more sections secured to the hub section forming one or more grooves in combination with the hub section.

A further object is to provide spacer washers, any number of which may be inserted between the pulley sections for increasing the width of the pulley groove for receiving various sizes of belts. Also to provide securing means extending through the sections and through registering apertures therein for securing the sections together.

A further object is to provide the pulley sections with registering bolt receiving apertures and alined grooves for the reception of the securing bolts and the spacer washers with notches adapted to register with the bolt holes so the bolts may pass through the entire pulley assembly.

A further object is to provide the pulley sections with axial alined chambers for the reception of hub sections of adjacent pulley section members, and the hub sections and chambers with grooves parallel to the axis of the pulley for the reception of opposite sides of the securing bolts.

A further object is to provide an adjustable multiple pulley formed from axially connected sections having hubs in recesses and spacer members in the recesses for varying the size of V-shaped belts receivable in the pulley grooves.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 6 is a vertical longitudinal sectional view through the pulley, showing an insert member for forming a double pulley.

Figure 7 is a view similar to Figure 6 but showing two insert members for forming a triple pulley.

Figure 8 is a view similar to Figure 6, but showing insert washers for forming a double pulley for the reception of belts larger than receivable in Figure 6.

Figure 9 is a perspective view of one of the insert members.

Figure 10 is an end view of one of the insert members.

At the present time it is necessary for the vendor of pulleys to carry in stock a great number of pulleys to meet the demand for size and multiple combinations for various sizes of belts and a plurality of belts of the same size. In the present device the pulley is so constructed that all sizes and combinations can be obtained by assembling a limited number of parts.

Figure 1:
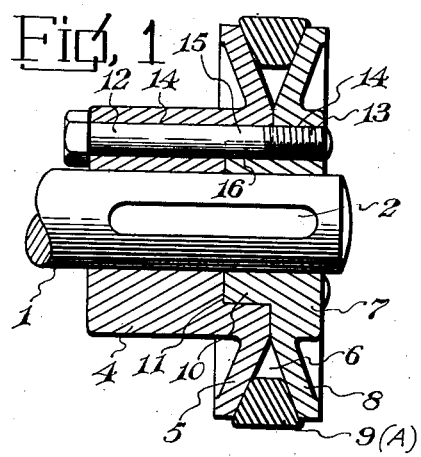
Figure 1 is a vertical longitudinal sectional view through the pulley.

Referring to the drawings, the numeral 1 designates a conventional form of pulley shaft having key slots 2 therein for the reception of keys 3. The improved pulley comprises a hub section 4 which is keyed on the shaft and which hub section is provided with an annular flange 5, forming one side of the V-shaped belt groove 6. Disposed on the shaft 1 is the outer pulley section 7, which is provided with an annular flange 8 forming the outer side of the pulley groove, reference being had particularly to Figure 1. The pulley groove 6, in Figure 1, is for the reception of an A size belt 9. The pulley section 7 is provided with a hub 10 which extends into a chamber 11 of the hub 4 and snugly fits the same. Both sections are held on the shaft by the keys 3. Extending longitudinally through the pulley sections are securing bolts 12, the outer ends of which are threaded at 13 into the outer pulley sections 7 for securely holding the sections together.

Any number of bolts 12 may be used, however for purposes of illustration two are shown. It will be noted that the bolts 12 extend through alined apertures 14 in the sections 4 and 7 and through semicircular grooves 15 and 16 in the wall of the chamber 11 and in the hub 10 of the outer section 7, thereby securely locking the parts against rotation in relation to each other at all times and placing part of the strain transversely on the bolts.

Figure 2:
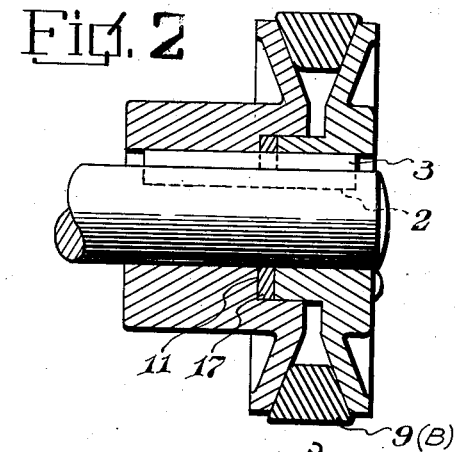
Figure 2 is a view similar to Figure 1, showing the pulley expanded for the reception of a larger size belt.

When it is desired to enlarge the pulley groove for the reception of the next size belt, known as B size, shown in Figure 2, the bolts 12 are removed and a spacer washer 17 is placed in the bottom of the chamber 11, and then the bolts are placed in position and tightened so that the hub 10 will be drawn tight against the spacer washer. The spacer washers 17 are provided with key receiving recesses 18 for the reception of the key 3 and with notches 19 which register with the grooves 15 and 16 so the bolts will pass through the parts.

Figure 3:
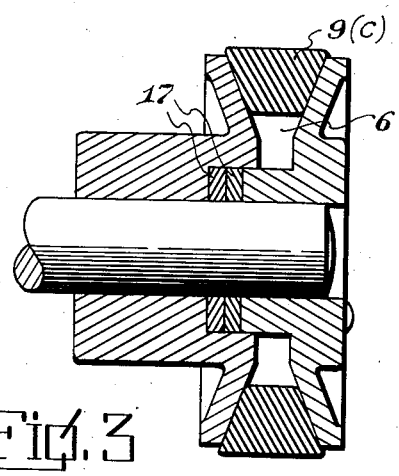
Figure 3 is a view similar to Figure 1 and Figure 2, but showing the pulley adjusted for a still further size of belt.
Figure 4:
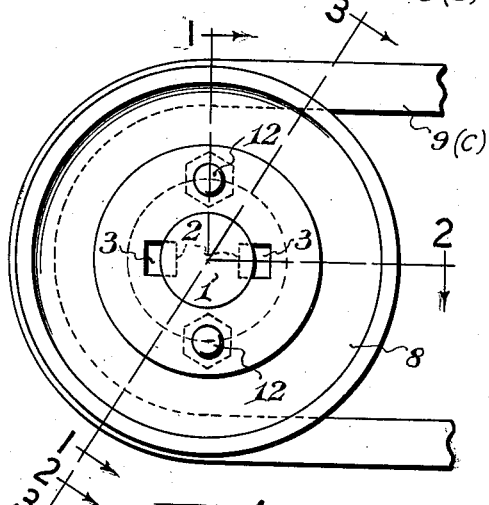
Figure 4 is a view in elevation of the pulley.
Figure 5:
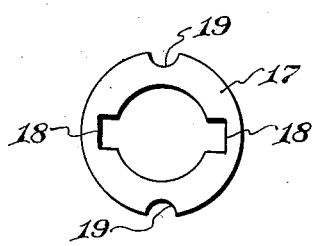
Figure 5 is a plan view of one of the extension washers.

When it is desired to further enlarge the V-groove 6 to the size shown in Figure 3, two spacer washers 17 are placed in the bottom of the chamber 11, therefore it will be seen that a number of groove sizes can be obtained by increasing or diminishing the number of spacer washers used.

When a double groove pulley is desired an insert member 20 is placed between the shaft carried member 4 and the outer member 7. Insert members are provided with chambers 21 for the reception of hubs 22 of adjacent similar members and the hubs 10 of the outer member 7, clearly shown in Figure 6, otherwise the construction is the same. When it is desired to provide a triple pulley, as shown in Figure 7, two insert members 20 are used. It will be noted that the pulley grooves are the same size in Figures 6 and 7. This may be varied by the insertion of spacer washers 17 between the parts as shown in Figure 8 for larger belts.

It is obvious that two different sizes of grooves may be provided in a pulley, as shown in Figure 8 by eliminating one of the spacer washers. The insert members have their hubs 22 provided with grooves 23 similar to the grooves 16 for the reception of the bolts and grooves 24 in the chambers 21 thereof similar to the grooves 15 for the reception of the bolts.

From the above it will be seen that an adjustable pulley is provided whereby a plurality of groove sizes may be obtained and that various groove combinations can be assembled with the minimum number of parts thereby obviating the necessity of the vendor carrying, in stock, all of the different sizes of pulleys as is now the custom, as there are standard sizes and special sizes, consequently a large stock has to be carried. In applicant's device all combinations can be easily assembled from a minimum number of parts.

Although applicant has shown a key 3 running the full length of the pieces in Figure 2, it is obvious that a set screw can be used in the hub 4 or a short key in the hub and the parts can be held together for simultaneous rotation by the studs 15.

The invention having been set forth what is claimed as new and useful is:

1. An expansible pulley comprising a hub, a flange carried by said hub, a second flange, a second hub carried by the second flange and disposed in an annular chamber in the first mentioned hub, the outer periphery of the second mentioned hub having semicircular bolt receiving grooves parallel to the axis of the hubs, the inner periphery of the first mentioned hub having semicircular grooves therein parallel to the axis of the hubs, said last named grooves being in alinement with the first mentioned grooves and securing bolts extending through said grooves and said hubs.

2. An expansible pulley comprising a hub adapted to be received on a shaft, a flange carried by said hub, a second hub disposed within an annular channel of the first mentioned hub, a flange carried by the second mentioned hub, the outer periphery of the second mentioned hub having longitudinal grooves therein in registry with longitudinal grooves in the periphery of the annular channel and adapted to register with the first mentioned grooves and bolts extending through the first mentioned hub and through said registering grooves and adapted to secure said hubs together.

3. A device as set forth in claim 2 including a spacer member in the bottom of the annular groove and having peripherial grooves registering with the grooves in the second mentioned hub and through which the bolts extend.

4. A device as set forth in claim 2 including a plurality of spacer discs disposed in the annular chamber of the first mentioned hub and having registering semicircular grooves registering with the aperture in the first mentioned hub and the groove in the second mentioned hub and through which said bolts extend.

CHARLIE M. LIVINGSTON.